(12) United States Patent
Mühlhäuser

(10) Patent No.: US 8,230,660 B2
(45) Date of Patent: Jul. 31, 2012

(54) METHOD OF INSTALLING A CABLE IN THE TOWER OF A WIND POWER PLANT

(75) Inventor: Markus Mühlhäuser, Gschwend (DE)

(73) Assignee: Schuler Pressen GmbH & Co, KG, Göppingen (DE)

( * ) Notice: Subject to any disclaimer, the term of this patent is extended or adjusted under 35 U.S.C. 154(b) by 0 days.

(21) Appl. No.: 12/807,768

(22) Filed: Sep. 14, 2010

(65) Prior Publication Data
US 2011/0061314 A1   Mar. 17, 2011

(30) Foreign Application Priority Data
Sep. 17, 2009   (DE) .................. 10 2009 041 982

(51) Int. Cl.
*E04B 1/00*   (2006.01)
*E04C 3/00*   (2006.01)
*E04H 12/00*   (2006.01)

(52) U.S. Cl. ............. 52/745.17; 52/40; 52/831; 52/845; 52/848; 52/851; 52/852; 52/854; 52/855

(58) Field of Classification Search ............ 52/40, 831, 52/651.01, 845, 848, 655.1, 851, 852, 854, 52/855
See application file for complete search history.

(56) References Cited

U.S. PATENT DOCUMENTS

| | | | | |
|---|---|---|---|---|
| 3,747,695 A | * | 7/1973 | Branham | 173/151 |
| 4,311,434 A | * | 1/1982 | Abe | 416/142 |
| 5,247,776 A | * | 9/1993 | Tamayo | 52/745.17 |
| 6,467,233 B1 | * | 10/2002 | Maliszewski et al. | 52/831 |
| 6,505,785 B2 | * | 1/2003 | Willis et al. | 290/55 |
| 6,522,025 B2 | * | 2/2003 | Willis et al. | 290/55 |
| 6,614,125 B2 | * | 9/2003 | Willis et al. | 290/55 |
| 6,713,891 B2 | * | 3/2004 | Kirkegaard et al. | 290/44 |
| 7,218,013 B2 | * | 5/2007 | Platt | 290/55 |
| 7,442,009 B2 | * | 10/2008 | Arel | 416/142 |
| 7,982,330 B1 | * | 7/2011 | Ueno et al. | 290/55 |
| 8,033,078 B2 | * | 10/2011 | Llorente Gonzalez | 52/745.04 |
| 2002/0012582 A1 | * | 1/2002 | Kirkegaard et al. | 415/4.3 |
| 2003/0071468 A1 | * | 4/2003 | Platt | 290/55 |
| 2003/0183594 A1 | * | 10/2003 | Torres Martinez | 212/196 |
| 2005/0117977 A1 | * | 6/2005 | Rasumussen | 405/253 |
| 2006/0213145 A1 | * | 9/2006 | Haller | 52/651.01 |
| 2007/0296220 A1 | | 12/2007 | Kristensen | |
| 2009/0284012 A1 | * | 11/2009 | Mortensen | 290/44 |
| 2009/0307998 A1 | * | 12/2009 | Zavitz et al. | 52/152 |
| 2009/0308006 A1 | * | 12/2009 | Zavitz et al. | 52/294 |

(Continued)

FOREIGN PATENT DOCUMENTS
WO   WO 2008/000565 A2   1/2008

*Primary Examiner* — Mark Wendell
(74) *Attorney, Agent, or Firm* — R. S. Lombard; K. Bach

(57) ABSTRACT

A method and apparatus for mounting at least one line in a tower of a wind power plant, the line is provided in the tower before its erection in shortened, preferably folded or wound-up form. The tower also includes a means for extending the line, after erection of the tower so that the lower end of the line is lowered in a controlled manner to the bottom of the tower and can be attached there to a connector and the upper end is extended to a connector at the top of the tower if not already connected to the connector.

4 Claims, 1 Drawing Sheet

U.S. PATENT DOCUMENTS

| | | |
|---|---|---|
| 2010/0074760 A1* | 3/2010 | Sherman et al. .......... 416/244 R |
| 2010/0236161 A1* | 9/2010 | Livingston et al. ........... 52/125.2 |
| 2010/0254813 A1* | 10/2010 | Dawson et al. ............ 416/146 R |
| 2011/0088331 A1* | 4/2011 | Olgaard ............................ 52/40 |
| 2011/0094987 A1* | 4/2011 | Botwright et al. ............. 212/274 |
| 2011/0173811 A1* | 7/2011 | Iversen ........................ 29/889.1 |
| 2011/0206510 A1* | 8/2011 | Langen et al. .................. 416/61 |
| 2011/0221215 A1* | 9/2011 | Botwright ................... 294/81.4 |
| 2011/0278431 A1* | 11/2011 | Knox et al. ................... 249/141 |
| 2012/0043680 A1* | 2/2012 | Knox et al. ..................... 264/35 |
| 2012/0057979 A1* | 3/2012 | Schellstede ............... 416/169 R |

* cited by examiner

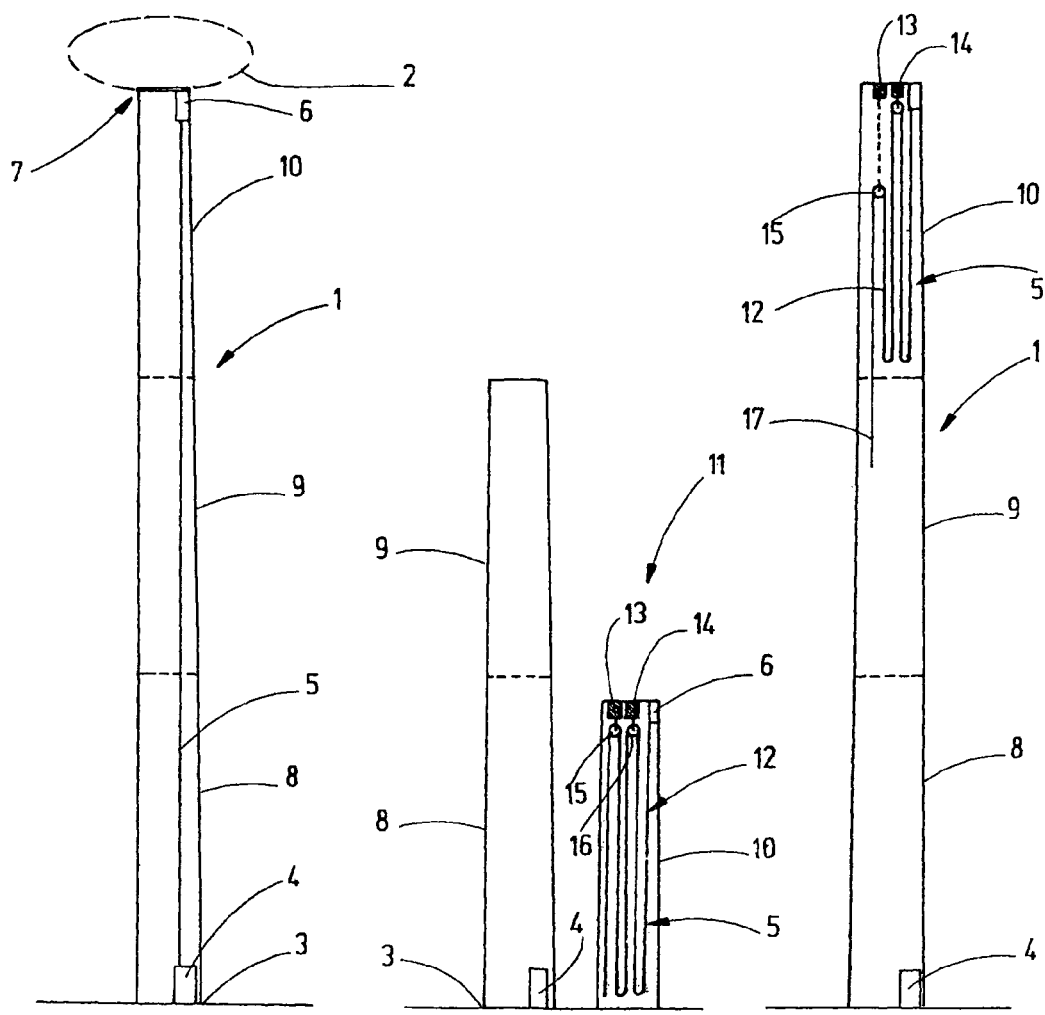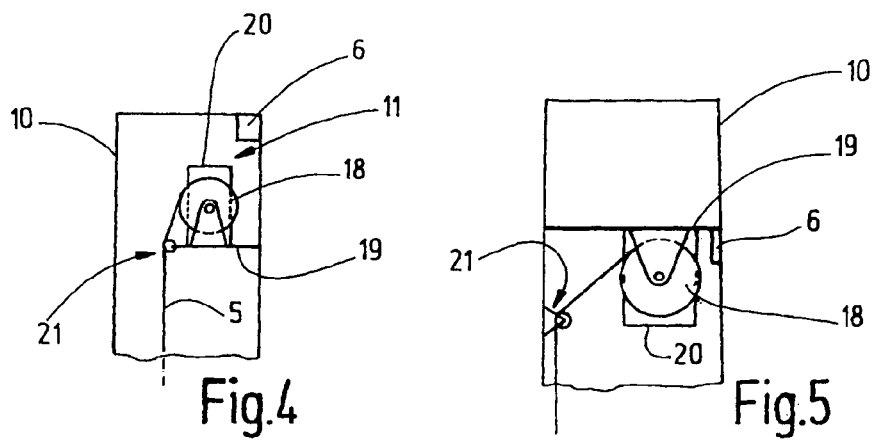

METHOD OF INSTALLING A CABLE IN THE TOWER OF A WIND POWER PLANT

CROSS-REFERENCE TO RELATED APPLICATION

This application claims the priority benefits of German Application No. 10 2009 041 982.9-15 filed Sep. 17, 2009.

BACKGROUND OF THE INVENTION

The invention relates to a method of constructing a wind power plant and to such a wind power plant. Wind power plants generally comprise a tower and arranged at the upper end thereof, a gondola carrying a rotor and at least one generator. The current produced by the generator is conducted from the upper end of the tower via a cable downward, where it is fed directly or indirectly into an electrical power supply system. The electric cables need to be installed in the tower during, or after the tower is erected. There is at least one electric cable and further lines such as electrical conductors, fluid lines and similar. The installation of these lines over a height of 80 meters or more requires substantial efforts and expenses. The tower is supplied to the construction site generally in several parts which are assembled at the site. Subsequently, the cables are installed which involves a substantial amount of installation time.

It is the object of the invention to provide a method for the erection of towers of wind power plants wherein the assembly time is shortened. It is furthermore an object of the invention to provide a tower which can be assembled within a relatively short time period.

SUMMARY OF THE INVENTION

The objects of the invention are achieved with the method and the apparatus for a wind power generation plant described herein. The method of the present invention includes mounting at least one line in a tower of a wind power plant, the line is provided in the tower before its erection in shortened, preferably folded or wound-up form. The tower also includes a means for extending the line, after erection of the tower so that the lower end of the line is lowered in a controlled manner to the bottom of the tower and can be attached there to a connector and the upper end is extended to a connector at the top of the tower if not already connected to the connector.

With the method according to the invention, the tower of the wind power plant is provided in the form of at least two or several segments. They are arranged at the construction site on top of one another and are joined to one another. The uppermost segment includes a cable or another line which, after the erection of the tower, should extend from the upper end of the tower down to the bottom end thereof. The cable or other line is pre-mounted in the upper tower segment in its full length. It particular, the upper end of the line or cable may already been connected. A cable or line accommodating arrangement disposed in the upper tower segment securely retains the line during transport. When the upper tower segment is mounted at the upper end of the tower at the construction site, the line or cable can be lowered down by the storage arrangement in a controlled manner. The lower end of the line is then connected at the tower bottom as desired.

The method according to the invention facilitates in particular the mounting of electric cables which is designed for the transmission of the generator power output which, today, is quite substantial comprising several megawatts. Because of the required cross-section of the copper cables the necessary insulation and the substantial height of the tower and consequently the length of the cable, these cables have a substantial weight. With the method according to the invention, the cable can be installed within a short time period and little expenditures. The mounting process for the cable or also other lines is substantially simplified. Cost can be reduced and safety during erection of the tower can be improved.

In a particularly preferred embodiment of the invention the method according to the invention is used in connection with all lines which are difficult to install. Those lines, mainly cables, are preferably pre-mounted in the upper tower segment and stored therein in the form of loops or on rolls or wound on cable drums, preferably at the upper end of the upper tower segment.

Alternatively, the cable drums, may also be integrated into a platform, are arranged below such platform. It is also possible to deposit the cables loosely on the mounting platform and additionally fixed them thereon. The respective upper end of the cable may be free or, alternatively, it may already be mounted to the tower by its final mounting elements. In the upper area of the tower segment, means may be provided for attaching lifting devices which fix the cable rolls in position during the erection of the tower and the gondola. Furthermore, alternative arrangements may be present by which the cables or lines can be additionally fixed or retained, such as, reversing rollers, cable channels or similar.

The lines or cables may be mounted while the tower segment is laying on the floor, for example, in an assembly shop. The lines or cables are mounted in this case in a storage form, for example, in the form of loops or windings. After the erection of the tower and the mounting of the gondola, the loose lower cable ends may then be lowered by the lifting devices. If a cable drum is present, it may be wound off manually or by an auxiliary drive. After this installation of the cables or lines and after they are fixed and their lower ends are connected in the lower end of the tower bottom segment, the lifting devices may again be removed. However, the lifting devices may also remain in the tower for future use, for example, for servicing operations.

With the present invention, the pulling of the cables up through the erected tower is no longer necessary.

The invention makes it possible to provide all the lines and cables, which are required for the operation of a wind power plant, in one of the segments of the wind power plant, preferably in its upper segment already before the erection of the tower. However, the lines and cables may also be arranged in an intermediate segment which is provided specifically for that purpose and from which the lower ends of the cables and lines are lowered and the upper ends are pulled upwardly, for example, by means of a lifting device, which is arranged at the upper end of the upper tower segment. For further reduction of the installation time, the cables and lines may also be prepared, for example, be provided with cable connectors or other devices attached to the cable ends. If the cables to be installed in the tower are stored in the upper tower segment, it is possible and advantageous, to connect the upper ends of the cables and lines to their final mounting elements before the lower segment is erected and the tower is installed. The lines and cables are stored particularly in a form which permits the transport of the respective tower segment in horizontal position and facilitates an erection of the tower segment without detrimentally affecting or damaging the lines or cables stored in the tower segment.

BRIEF DESCRIPTION OF THE DRAWINGS

Particulars of embodiments of the invention are shown in the drawings, in which:

FIG. 1 is a schematic representation of a tower of a wind power plant;

FIG. 2 is a schematic representation of the tower of FIG. 1 during erection and assembly of the individual segments;

FIG. 3 is a schematic representation of the lowering of a line out of the upper tower segment for the mounting of the lines or cables;

FIG. 4 is a schematic representation of an alternative embodiment of the upper tower segment provided with a cable hoist; and, FIG. 5 is a schematic illustration of an alternative embodiment of the upper end of the upper tower segment with a cable hoist.

DESCRIPTION OF PREFERRED EMBODIMENTS

FIG. 1 shows a tower 1 of a wind power plant. The tower 1 carries a gondola 2 which may include, for example, an electric generator for the generation of electric power, not shown. The tower 1 extends from a foot 3 upwardly about 80 meters or more. At the foot 3 of the tower 1, there is an arrangement 4 which is electrically connected to an upper connecting point 6 at the upper end 7 of the tower 1 in or at the gondola 2 via at least one line 5, for example, an energy transmission cable.

The tower is preferably divided into several tower segments 8, 9, 10. The tower segments 8, 9, 10 are placed during erection of the tower on top of one another and are interconnected. While they are transported to the construction site in a horizontal position, they are erected at the construction site, for example, by a crane, which is not shown, and are mounted to one another in a vertical position.

One of the tower segments 8, 9, or 10, preferably the upper tower segment 10, as shown, in FIG. 2, but alternatively also the intermediate tower segment 9 or a lower tower segment, such as the tower segment 8, contains the line 5 in its full length. To this end, the respective tower segment, in this case, the segment 10 includes a storage arrangement 11 which can accommodate the line 5 over its full length and store it safely so that no part of the line 5 extends unprotected from the tower segment 10.

The storage arrangement 11 includes a storage space 12 which is formed, for example, by the interior of the tower segment 10 as well as accommodation arrangements for the line 5. The accommodation arrangements are formed in the present case by one or several lifting devices 13, 14 or hoists which may be arranged at the upper end of the tower segment 11 or at an intermediate floor or other carrier. In the present case, the line 5 is arranged in several loops which extend over reversing rollers of the hoists 13, 14.

The tower 1 is set up as follows:

First the tower segments 8, 9 are raised so that they extend vertically upwardly from the foot 3 of the tower 1. In the next step, the tower segment 10 is raised, as shown in FIG. 2, and then placed on top of the tower segment 9 and connected thereto. Then, as indicated in FIG. 3, it is started to lower the line 5 from the top segment 10 downwardly. To this end in the shown embodiment, first, the hoist 13 is activated so that the reversing roller 15 and the respective loop of the cable 5 move downwardly. As a result, the lower end 17 of the cable 5 leaves the storage space 12 and moves through the tower segments 10, 9 downwardly. At the same time, or subsequently, the hoist 14 is activated to move the reversing roller 16 and the line 5 downwardly into a completely extended state. In this way, the lower end 17 reaches the device 4 in tower segment 8 which is for example, a connector, a power module, a transformer or similar device. After connection of the cable end 17 to the device 4 the hoist 13, 14 may be removed. They may also remain in the tower 1 if desired. If only one hoist is provided, the procedure is the same for the one hoist.

The storage arrangement 11 may basically have any form which is suitable to store the line 5 in a folded or other space-saving form such as a winding in the respective tower segment, for example, the tower segment 10. FIG. 4 shows such an embodiment of the storage arrangement 11. It includes in this case a cable drum 18 which may be arranged, for example, on an intermediate floor 19. The cable drum 18 may be connected to a drive 20 which is indicated in FIG. 4 only schematically. The drive 20 may be a manual drive or a power drive, for example, a hydraulic or an electric drive. It may be designed to unwind the cable drum 18 which, in the rest state contains wound thereon almost the whole line 5. The drive may also be capable to generate a braking effect, for example, by being a self-locking drive. In the simplest case, the drive is a worm gear in engagement with a spur gear wherein the worm gear is provided with hand-operated wheel, a crank or a motor. The spur gear is then firmly connected to the cable drum 18 for rotation therewith.

Additional devices for the controlled stopping of the drum 18 such as blocking devices, brakes or similar, may be assigned to the drive 20, which devices however are not shown.

Furthermore, the tower segment 10 may be provided with means for guiding the line 5 such as a reversing roller 21 by which the line 5 is given side guidance in certain positions thereof.

As shown in FIG. 5, the cable drum 18 may also be arranged at another location, for example, below the intermediate floor 19. The above description applies correspondingly also in this case on the basis of the same reference numerals.

In the embodiment according to FIG. 5, the upper end of the cable 5 may be fixed to the cable drum so that it can be connected to the upper connector 6 only after the drum has been stopped. Alternatively, connecting means which permit rotation of the drum such as sliding control rings or similar may be provided via which the cable wound onto the cable drum 18 or the other line 5 is connected to the upper connector 6.

With the method according to the invention for the mounting of a line 5 in a tower 1 of a wind power plant, one of the tower segments 8, 9, 10 is provided with the respective line 5 before the erection of the tower. The line is stored in the respective segment in a compact or shortened form, preferably folded or wound up. In addition, means such as storage arrangement 11 are provided in the respective segment 8, 9, or 10 for the controlled extension, that is winding off or lowering, the line 5. The respective tower segment 10 is installed in the tower with the line stored and locked therein in folded or wound-up form. Then the storage arrangement 11 is then released to such an extent that the lower end 17 of the line 5 can be lowered down to the tower footing 3 and can be connected there. If necessary, then the upper end is connected. It may be necessary to raise the upper end somewhat for that purpose. Then, however, only the weight of the upper end of the line 5, not the weight of the whole line 5 needs to be overcome to raise the upper end of the line 5 to the connector 6.

REFERENCE NUMERALS 1 tower
2 gondola
3 tower foot, tower footing
4 arrangement 5 line, cable
6 connector
7 upper end
8, 9, 10 tower segments
11 storage arrangement
12 storage space
13, 14 lifting device, hoist
15, 16 reversing rollers
17 lower end of the line, cable
18 cable drum
19 intermediate floor
20 drive/brake
21 reversing roller

What is claimed is:

1. A method of erecting a wind power plant having a tower (1) comprising at least two segments (8, 9, 10) erected at a construction site to provide a tower of a predetermined height between a footing (3) and a top end thereof with at least one energy transmission line (5) of a length so as to extend between the bottom and the upper end (7) of the tower, said method comprising the steps of:
  installing the at least one energy transmission line (5) in its entirety in the uppermost of the at least two tower segments (8, 9, 10) in a folded or wound-up arrangement before the erection of the tower at the construction site at the upper end (7) of the tower (1);
  attaching the lower end (17) of the at least one energy transmission line (5) at the upper end (7) to be held in position;
  erecting the at least two tower segments (8, 9, 10) so as to set up the tower, and extending the lower end (17) of the at least one energy transmission line (5) stored in the uppermost of the at least two tower segments (8-10) down to the footing (3) of the tower (1) and connecting it to a bottom electrical connector (4) and the other end to a top electrical connector (6).

2. The method according to claim 1, wherein the at least one energy transmission line (5) is temporarily supported by a line accommodating arrangement (11) which is arranged at the upper end (7) of the tower (1) in the uppermost of the at least two tower segments (8, 9, 10).

3. The method according to claim 1, wherein, after erection of the at least two tower segments (8, 9, 10), the energy transmission line (5) is lowered with the lower end (17) ahead in a straight-line form in a controlled manner.

4. The method according to claim 1, wherein, after erection of the at least two tower segments (8, 9, 10), the energy transmission line (5) is lowered down from the folded or wound up arrangement thereof in a controlled manner with the upper end of the energy transmission line (5) mounted at the top.

* * * * *